US008377413B2

(12) United States Patent
Ito et al.

(10) Patent No.: US 8,377,413 B2
(45) Date of Patent: Feb. 19, 2013

(54) METHOD FOR PREPARING MAYENITE-CONTAINING OXIDE AND METHOD FOR PREPARING ELECTROCONDUCTIVE MAYENITE-CONTAINING OXIDE

(75) Inventors: Kazuhiro Ito, Tokyo (JP); Satoru Watanabe, Tokyo (JP); Naomichi Miyakawa, Tokyo (JP); Setsuro Ito, Tokyo (JP); Kazunari Watanabe, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/192,568

(22) Filed: Jul. 28, 2011

(65) Prior Publication Data

US 2011/0278509 A1   Nov. 17, 2011

Related U.S. Application Data

(63) Continuation of application No. PCT/JP2010/051628, filed on Feb. 4, 2010.

(30) Foreign Application Priority Data

Feb. 5, 2009 (JP) ................................. 2009-024625

(51) Int. Cl.
*C01F 7/00* (2006.01)
(52) U.S. Cl. ................ 423/600; 204/157.4; 204/157.44; 204/157.5
(58) Field of Classification Search .................. 423/111, 423/137, 600, 625, 636; 204/157.4, 157.44, 204/157.5; 252/518.1
See application file for complete search history.

(56) References Cited

U.S. PATENT DOCUMENTS

| 7,465,433 | B2 | 12/2008 | Hosono et al. |
| 7,670,585 | B2 | 3/2010 | Hosono et al. |
| 7,722,846 | B2 | 5/2010 | Hosono et al. |
| 2008/0089826 | A1 | 4/2008 | Hosono et al. |
| 2008/0252194 | A1 | 10/2008 | Kuroiwa et al. |
| 2008/0265774 | A1 | 10/2008 | Webster et al. |
| 2011/0068678 | A1 | 3/2011 | Watanabe et al. |
| 2011/0155970 | A1 | 6/2011 | Ito et al. |
| 2011/0182803 | A1 | 7/2011 | Ito et al. |

FOREIGN PATENT DOCUMENTS

| JP | 2005-8429 | 1/2005 |
| JP | 2005-67915 | 3/2005 |
| WO | 03/089373 | 10/2003 |
| WO | 2005/000741 | 1/2005 |
| WO | 2006/129674 | 12/2006 |
| WO | 2006/129675 | 12/2006 |

OTHER PUBLICATIONS

International Search Report issued Mar. 9, 2010 in PCT/JP10/051628 filed Feb. 4, 2010.
F.M. Lea and C.H. Desch, The Chemistry of Cement and Concrete, $2^{nd}$ ed., (1956) p. 52.

*Primary Examiner* — Steven Bos
(74) *Attorney, Agent, or Firm* — Oblon, Spivak, McClelland, Maier & Neustadt, L.L.P.

(57) ABSTRACT

To provide a method for preparing a mayenite-containing oxide containing a mayenite type compound and having a hydride ion density of at least $1\times10^{18}/cm^3$ without need for expensive facilities, control of complicated reaction conditions or a long period of reaction time. A method for preparing a mayenite-containing oxide, which comprises a firing step of heating a starting material having a molar ratio of $CaO:Al_2O_3$ being from 9:10 to 14:5 based on the oxides at a temperature of from 900 to 1,300° C. to obtain a fired powder and a hydrogenation step of firing the fired powder at a temperature of at least 1,210° C. and lower than 1,350° C. in a hydrogen-containing gas having an oxygen partial pressure of at most 1,000 Pa to obtain a mayenite-containing oxide containing a mayenite type compound and having a hydride ion density of at least $1\times10^{18}/cm^3$, and a method for preparing an electroconductive mayenite-containing oxide, which comprises irradiating the obtained mayenite-containing oxide with an ultraviolet ray etc. to obtain a mayenite-containing oxide containing an electroconductive mayenite type compound.

16 Claims, No Drawings

METHOD FOR PREPARING MAYENITE-CONTAINING OXIDE AND METHOD FOR PREPARING ELECTROCONDUCTIVE MAYENITE-CONTAINING OXIDE

This application is a continuation application of PCT Application No. PCT/JP2010/051628, filed Feb. 4, 2010, which is based upon and claims the benefit of priority from Japanese Patent Application No. 2009-024625 filed on Feb. 5, 2009. The contents of those applications are incorporated herein by reference in its entirety.

TECHNICAL FIELD

The present invention relates to a method for preparing an oxide containing a mayenite type compound and a method for preparing an electroconductive mayenite-containing oxide.

BACKGROUND ART

A mayenite type compound has a typical composition of $12CaO.7Al_2O_3$ (hereinafter referred to also as "C12A7") and a characteristic crystal structure having three-dimensionally linked voids (cages) with a diameter of about 0.4 nm. The framework forming the cages has a positive charge, and 12 cages are formed in a unit cell. And, one sixth of the cages are occupied by oxygen ions so that an electrically neutral condition of the crystal is satisfied, but these oxygen ions have chemically different properties from those of the other oxygen ions constituting the framework and are thus particularly called "free oxygen ions". For this reason, the C12A7 crystal is denoted as $[Ca_{24}Al_{28}O_{64}]^{4+}.2O^{2-}$ (Non-patent Document 1).

A powder of C12A7 crystal or its sintered body may be subjected to heat treatment in a reducing atmosphere to let electrons be included in the cages, thereby to impart permanent conductivity at room temperature (Patent Document 1). These included electrons are loosely bound to the cages and can freely move in the crystal, whereby conductivity is imparted to the mayenite type compound (Patent Document 2).

Further, a powder of C12A7 crystal or its sintered body may be subjected to heat treatment in an atmosphere of an inert gas containing hydrogen to let $H^-$ be included in the cages. While $H^-$ is included in the cages, it is irradiated with an ultraviolet ray, electron beam or a plasma, whereby electrons are included in the cages by a reaction of $H^- \rightarrow H^0 + e^-$. These included electrons are loosely bound to the cages and can freely move in the crystal, whereby permanent conductivity can be imparted to the mayenite type compound at room temperature (Patent Document 3). The sintered body may be properly masked before the irradiation with an ultraviolet ray etc. in order to obtain a fine wiring pattern easily.

Since such a mayenite type compound has a high reducing property, electrons are likely to be discharged from the cages at high temperature as compared with free oxygen ions. For this reason, when a mayenite type compound wherein the cages include only electrons is heated to high temperature such as 500° C. in air, oxygen in the atmosphere changes to oxygen ions due to electrons donated from the cages, and a reaction of introducing the oxygen ions into the cages easily occurs. The reason is that since the framework forming the cage structure of the mayenite compound has a positive charge, oxygen ions having a negative charge are introduced into the cages, but oxygen molecules or oxygen atoms, which are electrically neutral, are less likely to be introduced.

Therefore, as compared with a mayenite type compound wherein only electrons are included, a mayenite type compound having a low electron-donating property to oxygen in air is capable of suppressing the reaction of generating oxygen ions from oxygen molecules and thereby lowering the introducing rate of oxygen ions to the cages.

As a method to obtain such a mayenite type compound, Patent Document 3 discloses a method wherein first, a mayenite type compound is synthesized at a temperature of from 1,200 to 1,415° C., and then it is subjected to hydrogen reduction treatment to obtain a mayenite type compound wherein hydride ions are included.

PRIOR ART DOCUMENTS

Patent Documents

Patent Document 1: WO2005/000741
Patent Document 2: WO2006/129675
Patent Document 3: WO2003/089373

Non-Patent Document

Non-Patent Document 1: F. M. Lea and C. H. Desch, The Chemistry of Cement and Concrete, 2nd ed., p. 52, Edward Arnold & Co., London, 1956

DISCLOSURE OF INVENTION

Technical Problem

However, in the method disclosed in Patent Document 3, a crystal powder having only the C12A7 structure is prepared and then is subjected to hydrogen reduction treatment to produce only a mayenite type compound, and thus this method requires expensive facilities, control of complicated reaction conditions and a long period of reaction time.

The object of the present invention is to solve such problems. That is, the present invention is to provide a method for preparing an oxide containing a mayenite type compound and having a hydride ion density of at least $1 \times 10^{18}/cm^3$ without need for expensive facilities, control of complicated reaction conditions or a long period of reaction time. Further, the present invention is to provide a method for preparing an electroconductive mayenite-containing oxide containing an electroconductive mayenite type compound including electrons and having an excellent secondary electron emission coefficient, by subjecting the above-obtained oxide to irradiation treatment.

Solution to Problem

The present invention provides the following (i) to (vii).
(i) A method for preparing a mayenite-containing oxide, which comprises a firing step of heating a starting material containing at least one compound selected from the group consisting of a calcium aluminate, calcium oxide, aluminum oxide, a calcium compound which becomes calcium oxide by firing and an aluminum compound which becomes aluminum oxide by firing, and containing Ca atoms and Al atoms in a ratio such that, by molar ratio based on CaO and $Al_2O_3$, $CaO:Al_2O_3$ is from 9:10 to 14:5, at a temperature of from 900 to 1,300° C. to obtain a fired powder, and a hydrogenation step of firing the fired powder at a temperature of at least 1,210° C. and lower than 1,350° C. in a hydrogen-containing gas having an oxygen partial pressure of at most 1,000 Pa to obtain a mayenite-containing oxide containing a mayenite type compound and having a hydride ion density of at least $1 \times 10^{18}/cm^3$.

(ii) The method for preparing a mayenite-containing oxide according to the above (i), wherein the hydrogen-containing gas is a mixed gas of hydrogen and an inert gas.

(iii) The method for preparing a mayenite-containing oxide according to the above (i) or (ii), wherein the hydrogen-containing gas further contains at least one member selected from the group consisting of a halogen and sulfur.

(iv) The method for preparing a mayenite-containing oxide according to any one of the above (i) to (iii), wherein the hydrogen-containing gas has a hydrogen concentration of from 0.2 vol % to 100 vol %.

(v) The method for preparing a mayenite-containing oxide according to any one of the above (i) to (iv), wherein the starting material contains at least one compound selected from the group consisting of calcium carbonate, calcium oxide and calcium hydroxide and at least one compound selected from the group consisting of aluminum hydroxide and aluminum oxide.

(vi) The method for preparing a mayenite-containing oxide according to any one of the above (i) to (v), wherein the mayenite-containing oxide has a hydride ion density of at least $1 \times 10^{19}/cm^3$.

(vii) A method for preparing an electroconductive mayenite-containing oxide, which comprises preparing the mayenite-containing oxide by the method as defined in any one of the above (i) to (vi), and irradiating the obtained mayenite-containing oxide with at least one member selected from the group consisting of electron beam, an ultraviolet ray having a wavelength of from 140 to 380 nm and a plasma to obtain a mayenite-containing oxide containing an electroconductive mayenite type compound.

Advantageous Effects of Invention

According to the present invention, it is possible to provide a method for preparing a high heat-resistant oxide containing a mayenite type compound and having a hydride ion density of at least $1 \times 10^{18}/cm^3$ without need for expensive facilities, control of complicated reaction conditions or a long period of reaction time. Further, it is possible to provide a method for preparing an electroconductive mayenite-containing oxide containing an electroconductive mayenite type compound including electrons and having an excellent secondary electron emission coefficient, by subjecting the above-obtained oxide to irradiation treatment.

DESCRIPTION OF EMBODIMENTS

Now, the present invention will be described.

The present invention is a method for preparing a mayenite-containing oxide, which comprises a firing step of heating a starting material containing at least one compound selected from the group consisting of a calcium aluminate, calcium oxide, aluminum oxide, a calcium compound which becomes calcium oxide by firing and an aluminum compound which becomes aluminum oxide by firing, and containing Ca atoms and Al atoms in a ratio such that, by molar ratio based on CaO and $Al_2O_3$, $CaO:Al_2O_3$ is from 9:10 to 14:5, at a temperature of from 900 to 1,300° C. to obtain a fired powder, and a hydrogenation step of firing the fired powder at a temperature of at least 1,210° C. and lower than 1,350° C. in a hydrogen-containing gas having an oxygen partial pressure of at most 1,000 Pa to obtain a mayenite-containing oxide containing a mayenite type compound and having a hydride ion density of at least $1 \times 10^{18}/cm^3$.

Such a preparation method will hereinafter be referred to also as "preparation method α of the present invention".

<Firing Step>

Hereinafter, the firing step in the preparation method α of the present invention will be described.

In the firing step, a starting material containing at least one compound selected from the group consisting of a calcium aluminate, calcium oxide, aluminum oxide, a calcium compound which becomes calcium oxide by firing and an aluminum compound which becomes aluminum oxide by firing, and containing Ca atoms and Al atoms in a ratio which will be described below.

Such a starting material is representatively any one of the following (1) to (5). The following mixtures of (1) to (4) are preferably homogeneously mixed. For this mixing, an automatic mortar or a ball mill may be used. Hereinafter, a calcium compound which becomes calcium oxide by firing and calcium oxide will be collectively referred to as a calcium compound, and an aluminum compound which becomes aluminum oxide by firing and aluminum oxide will be collectively referred to as an aluminum compound.

(1) A mixture of a calcium compound and an aluminum compound (2) A mixture of a calcium compound and a calcium aluminate (3) A mixture of an aluminum compound and a calcium aluminate (4) A mixture of a calcium compound, an aluminum compound and a calcium aluminate (5) Calcium aluminate The calcium compound may be one from which a fired powder described below may be obtained when a mixture of the above (1), (2) or (4) is heated at a temperature of from 900 to 1,300° C. For example, calcium carbonate, calcium oxide, calcium hydroxide, calcium hydrogen carbonate, calcium sulfate, calcium metaphosphate, calcium oxalate, calcium acetate, calcium nitrate or a calcium halide may be mentioned.

Among these calcium compounds, at least one member selected from the group consisting of calcium carbonate, calcium oxide and calcium hydroxide is preferred.

The aluminum compound may be one from which a fired powder described below may be obtained when a mixture of the above (1), (3) or (4) is heated at a temperature of from 900 to 1,300° C. For example, aluminum hydroxide, aluminum oxide, aluminum sulfate, aluminum nitrate or an aluminum halide may be mentioned.

Among these aluminum compounds, at least one member selected from the group consisting of aluminum hydroxide and aluminum oxide is preferred.

The calcium aluminate is a compound containing calcium oxide and aluminum oxide in a certain ratio and may be one from which a fired powder described below may be obtained when a mixture of one of the above (2) to (5) is heated at a temperature of from 900 to 1,300° C. For example, C12A7, $3CaO \cdot Al_2O_3$ (hereinafter sometimes referred to as "C3A"), $CaO \cdot Al_2O_3$ (hereinafter sometimes referred to as "CA") or $5CaO3Al_2O_3$ (hereinafter sometimes referred to as "C5A3") may be mentioned.

The starting material contains Ca atoms and Al atoms in a ratio such that, by molar ratio obtained on the assumption that they are present in the form of CaO and $Al_2O_3$ (i.e. molar ratio based on CaO and $Al_2O_3$), $CaO:Al_2O_3$ is from 9:10 to 14:5, preferably from 9.5:9.5 to 13:6, more preferably about 12:7.

When the molar ratio falls outside such a range, the content of the mayenite type compound contained in the mayenite-containing oxide obtained by the preparation method a of the present invention tends to be small. As a result, the hydride ion density of the mayenite-containing oxide to be obtained may possibly be less than $1\times10^{18}/cm^3$.

In the firing step, the starting material is heated at a temperature of from 900 to 1,300° C. to obtain a fired powder.

When heated at such a temperature, the starting material is less likely to be melted, and mostly a solid phase reaction occurs. As a result, an almost-powdery fired powder may be obtained. When heated at the above temperature, the powder may be agglomerated to form aggregates or may be partially sintered to form masses, but such aggregates and masses may be easily crushed by means of an automatic mortar, a ball mill, etc.

The fired powder is almost powdery, and the particle size is not particularly limited, but the average particle size is preferably from 5 to 100 μm. The average particle size means a value measured by laser diffraction scattering method.

Hereinafter, the average particle size of a powder means the value measured by the same method.

In the state before crushing where the above aggregates and masses are contained, the average particle size is preferably at most about 5 μm because the crushing will be easier.

As described above, when aggregates or masses have resulted or the particle size of the fired powder is larger than the desired size, and particularly when a fired powder having an average particle size of from 5 to 100 μm is intended to be obtained, it is preferred to be subjected to a rough crushing step by using an automatic mortar or a stamp mill.

The fired powder obtained by the firing step may be further pulverized to obtain fine particles before being subjected to the hydrogenation step described below. The pulverization is preferred because the fired powder thereby becomes more homogeneous, and thus the reactivity in the hydrogenation step will be higher, and the solid phase reaction in the hydrogenation step will become likely to proceed. Such pulverization may be performed by using e.g. a circulation type beads mill. It is preferred to pulverize the fired powder so that it will be from 0.5 to 50 μm (average particle size) because agglomeration thereby becomes relatively less likely to occur, and the solid phase reaction in the hydrogenation step becomes likely to proceed, and thus the processing time may be reduced.

The total content of a calcium aluminate, calcium oxide and aluminum oxide in the fired powder is preferably at least 80 mass %. Such a content is preferably at least 90 mass %, more preferably 95 mass %, further preferably 100 mass %, i.e. containing substantially no other component. The component other than those above which the fired powder may contain may, for example, be calcium carbonate which is not sufficiently decarbonated.

Examples of the fired powder include mixtures of the following (6) to (8), etc.

(6) A mixture containing a calcium aluminate and calcium oxide and/or aluminum oxide (7) A mixture of calcium oxide and aluminum oxide (8) A calcium aluminate. The calcium aluminate contains at least one member selected from the group consisting of C3A, CA and a calcium aluminate having another composition (composition other than C3A and CA).

As described above, in the firing step, the starting material is heated at a temperature of from 900 to 1,300° C. to obtain a fired product, and this temperature is preferably from 950 to 1,250° C., more preferably from 1,000 to 1,200° C. Such a temperature to heat a fired powder will hereinafter be referred to also as "heating temperature". Further, the time in which the fired product is held at a heating temperature to be heated will hereinafter be referred to also as "heating time".

It is preferred to heat the starting material at a heating temperature within such a range because it is thereby possible to let the solid phase reaction proceed almost without melting. If the heating temperature is less than 900° C., in a case where, for example, a starting material containing calcium carbonate is used, carbon dioxide gas generated from calcium carbonate remains, and it may be possible that the solid phase reaction of calcium oxide and aluminum oxide becomes less likely to proceed and the homogeneity of the fired powder becomes worse. Further, if the fired powder is subjected to the hydrogenation step described below in a state where calcium carbonate remains in the fired powder, carbon dioxide gas may be drastically emitted, and the inter wall of a treatment container (for example, a crucible made of carbon) may possibly be severely damaged. The number of times of use of such a damaged treatment container will be decreased, which results in a high exchange frequency, and thus the efficiency will be poor. Further, in order to prevent drastic emission of carbon dioxide gas, the temperature region where carbon dioxide gas is emitted from calcium carbonate may be gradually raised to prevent damage of the treatment container, but the firing time (reduction time described below) in the hydrogenation step becomes long, and thus it may be possible that the mayenite-containing oxide cannot be efficiently prepared. On the other hand, a heat temperature of higher than 1,300° C. is not preferred because at such a temperature, sinter of the fired powder will proceed, and the fired powder will become hard and the pulverizability will be worse, and thus it will require a long period of time for pulverization.

The heating time in which the starting material is held at a heating temperature of from 900 to 1,300° C. is not particularly limited, but it is preferably from 0.5 to 6 hours because it is thereby possible to maintain the homogeneity and to ensure the high productivity. The heating time is preferably at least 0.5 hour because the solid phase reaction will thereby more sufficiently proceed and the homogeneity will thereby be better. Further, the heating time is preferably at most 6 hours because the productivity will thereby be better. The heating time is more preferably from 1 to 4 hours, further preferably from 1.5 to 3 hours.

<Hydrogenation Step>

Hereinafter, the hydrogenation step in the preparation method a of the present invention will be described.

In the hydrogenation step, the fired powder is fired in a hydrogen-containing gas.

In the hydrogenation step, the temperature at which the fired powder is fired in a hydrogen-containing gas will hereinafter be referred to also as "reduction temperature". Further, the time in which the fired powder is fired in a hydrogen-containing gas will hereinafter be referred to also as "reduction time".

Now, the hydrogen-containing gas will be described.

The hydrogen-containing gas used in the hydrogenation step is a gas containing hydrogen and having an oxygen partial pressure of at most 1,000 Pa. This hydrogen-containing gas is preferably a mixed gas of hydrogen and an inert gas. The hydrogen-containing gas may contain at least one member selected from the group consisting of a halogen (this means fluorine, chlorine, bromine or iodine) and sulfur. Further, the water vapor pressure is preferably at most 1,000 Pa.

A mayenite type compound has, as described above, a characteristic crystal structure having three-dimensionally linked voids (cages). The framework forming the cages has a positive charge, and negative ions such as oxygen ions are included in the cages so that an electrically neutral condition of the crystal is satisfied.

Accordingly, when the negative ions in the cages become insufficient, the electrically neutral condition becomes unsatisfied, and the mayenite type compound will be decomposed into a calcium aluminate such as CA or C3A. According to a literature (Katsuro Hayashi, Peter V. Sushko, et. al., J. Phys. Chem., B, 2005, 109, p. 23836-23842), there is an upper limit of the hydride ion density which the cages are able to include therein, and it is considered to be about $1\times10^{20}/cm^3$. The negative ion density in the cages required to satisfy the electrically neutral condition is, in the case of monovalent ions, $2.3\times10^{21}/cm^3$. Therefore, since merely hydride ions are not sufficient as the negative ions, unless negative ions which will become e.g. $O^{2-}$ or $OH^-$ are present in the mixed gas, a mayenite type compound is less likely to be synthesized. When the negative ions as impurities are not present in the mixed gas, an order of magnitude of vol ppm of oxygen or water vapor is required in the hydrogen-containing gas.

The fired powder is fired in the hydrogen-containing gas, whereby it is possible to obtain a mayenite-containing oxide containing a mayenite type compound having free oxygen ions in the cages substituted by hydride ions. "Hydride ions" mean $H^-$, $H_2^-$ and $H^{2-}$.

The hydrogen concentration in the hydrogen-containing gas is not particularly limited, but it is preferably from 0.2 vol % to 100 vol %, more preferably from 1 to 90 vol %. When the hydrogen concentration is from 1 to 90 vol %, the mayenite-containing oxide to be obtained tends to have a higher hydride ion density, and the hydride ion density of the obtained mayenite-containing oxide is likely to be at least $1\times10^{19}/cm^3$.

The mayenite type compound contained in the mayenite-containing-oxide obtained by using the hydrogen-containing gas containing a halogen or sulfur sometimes becomes one having free oxygen ions in the cages substituted by negative ions of an atom having a smaller electron affinity than that of an oxygen atom.

Such a negative ion may, for example, be $F^-$, $Cl^-$, $Br^-$, $I^-$ or $S^{2-}$. Although a hydride ion is also a negative ion of an atom having a smaller electron affinity than that of an oxygen atom, here, the above negative ion is defined as not including a hydride ion.

In a case of using a hydrogen-containing gas containing a halogen or sulfur, the amount of the halogen or sulfur in the hydrogen-containing gas is preferably from 0.01 to 10 vol %, particularly preferably from 0.01 to 5 vol %.

Further, in a case where the hydrogen-containing gas contains $O_2$ (oxygen), the oxygen partial pressure is at most 1,000 Pa. Since there is also a case where the hydrogen-containing gas does not contain oxygen, the oxygen partial pressure of the hydrogen-containing gas is from 0 to 1,000 Pa. If the oxygen partial pressure of the hydrogen-containing gas exceeds 1,000 Pa, a reaction wherein hydride ions which have entered into the cages of the mayenite type compound are substituted by OH—will proceed, and the hydride ion density of the mayenite-containing oxide to be obtained tends to be decreased.

The oxygen partial pressure of the hydrogen-containing gas is preferably at most 10 Pa, further preferably at most $10^{-1}$ Pa. Further, the oxygen partial pressure is preferably at least $10^{-11}$ Pa. The hydrogen-containing gas preferably contains oxygen within a range where the oxygen partial pressure becomes such a preferred value because a mayenite type compound having a high hydride ion density may thereby be obtained even by firing at a lower temperature for a shorter period of time.

Further, in a case where the hydrogen-containing gas contains water vapor, the water vapor partial pressure is at most 1,000 Pa. Since there is a case where the hydrogen-containing gas does not contain water vapor, the water vapor partial pressure of the hydrogen-containing gas is preferably from 0 to 1,000 Pa. If the water vapor partial pressure of the hydrogen-containing gas exceeds 1,000 Pa, a reaction wherein hydride ions which have entered into the cages of the mayenite type compound are substituted by $OH^-$ will proceed, and the hydride ion density of the mayenite-containing oxide to be obtained may possibly be decreased.

The water vapor partial pressure of the hydrogen-containing gas is more preferably at most 10 Pa, further preferably at most $10^{-1}$ Pa. Further, the water vapor partial pressure is more preferably at least $10^{-11}$ Pa. The hydrogen-containing gas preferably contains oxygen of at most 1,000 Pa within a range where the water vapor partial pressure becomes such a preferred value because a mayenite type compound having a high hydride ion density may thereby be obtained even by firing at a lower temperature for a shorter period of time. Further, the hydrogen-containing gas preferably contains an inert gas. The inert gas is not particularly limited as long as it is not reactive with a mayenite type compound, and it may, for example, be nitrogen or argon. The inert gas concentration in the hydrogen-containing gas is preferably from 10 to 99 vol %, more preferably from 50 to 99 vol %.

In the hydrogenation step, the fired powder is fired at a reduction temperature of at least 1,210° C. and lower than 1,350° C. in such a mixed gas. If the reduction temperature is lower than 1,210° C., the mayenite type compound tends to be difficult to be obtained. On the other hand, if the reduction temperature is at least 1,350° C., the number of hydride ions in the cages of the mayenite type structure will be decreased, and the hydride ion density will not be at least $1\times10^{18}/cm^3$.

If the reduction temperature is from 1,210 to 1,230° C., the content of the mayenite type compound contained in the mayenite-containing oxide to be obtained is about less than 30 vol %, and the rest tends to be mainly a calcium aluminate such as CA. And, the hydride ion density of the mayenite type compound in the mayenite-containing oxide tends to be about from 1 to $5\times10^{18}/cm^3$.

Therefore, the reduction temperature is preferably higher than 1,230° C., more preferably at least 1,290° C. and lower than 1,350° C. This is because when the reduction temperature is high, the content of the mayenite type compound in the mayenite-containing oxide to be obtained tends to be higher, and as a result, the hydride ion density of the mayenite-containing oxide to be obtained will be more increased.

The reduction time in which the fired powder is treated at a reduction temperature as described above is not particularly limited, but it is preferably from 0.5 to 6 hours, more preferably from 1 to 3 hours. The reduction time is preferably adjusted by e.g. the amount of the fired powder and the hydrogen concentration of the hydrogen-containing gas. For example, in a case of 3 g of the fired powder, it may be formed into a mayenite type compound partially having hydride ions included within about 3 hours to obtain a mayenite-containing oxide having a hydride ion density of at least $1\times10^{18}/cm^3$.

Further, the temperature raising rate to achieve the desired reduction temperature is preferably at least 50° C./hr, more preferably at least 200° C./hr. This is because the time of the hydrogenation step will thereby be short, and the productivity will be improved.

Further, after holding at a desired reduction temperature for a desired reduction time, the cooling rate is preferably at least 50° C./hr, more preferably 200° C./hr. This is because the time of the hydrogenation step will thereby be short, and the productivity will be improved. The cooling method after firing may be cooing in an atmosphere of an inert gas such as nitrogen or air cooling, but it is preferred to use a heating treatment furnace provided with a cooling system such as water cooling to cool as fast as possible.

It is preferred to carry out such a hydrogenation step in an electric furnace of a closed system while letting the above reactive gas flow through the furnace.

According to the preparation method a of the present invention as described above, a mayenite-containing oxide containing a mayenite type compound and having a hydride ion density of at least $1 \times 10^{18}/cm^3$ may be prepared by using inexpensive facilities, in a shorter period of time, and more easily. Accordingly, the mayenite-containing oxide may be efficiently mass produced. The hydride ion density is preferably at least $1 \times 10^{18}/cm^3$ as described above because an electroconductive mayenite type compound having a large secondary electron emission coefficient and having excellent electron emission characteristics may thereby be easily obtained, as described below.

The mayenite-containing oxide may contain, in addition to the mayenite type compound (C12A7), a calcium aluminate such as C3A or CA.

The hydride ion density of the mayenite-containing oxide is obtained as follows. First, an oxide α formed into powder is irradiated with an ultraviolet ray of 330 nm for 30 minutes to let the reaction of $H^- \rightarrow H^0 + e^-$ proceed sufficiently. Then, the amount of electrons detached from hydride ions is measured by electron spin resonance (electron spin resonance, manufactured by JOEL, Ltd., JES-TE200), and the obtained signal intensity is compared with the signal intensity of a standard sample of which electron density has already been obtained to obtain the electron density after ultraviolet ray irradiation. As the standard sample for electron spin resonance (ESR), copper(II) sulfate pentahydrate $CuSO_4 \cdot 5H_2O$ is used.

The hydride ion density of the mayenite-containing oxide may be determined also by using a secondary ion mass spectrometer (SIMS). In order to distinguish the hydride ions from $OH^-$, it is preferred to measure the infrared absorption spectrum (IR) to determine the concentration of $OH^-$. $OH^-$ concentration determined by IR is subtracted from the total amount of hydride ion density determined by SIMS, whereby the concentration only of hydride ions may be accurately determined.

From the viewpoint of the secondary electron emission coefficient, the hydride ion density of the mayenite-containing oxide is preferably at least $1 \times 10^{19}/cm^3$. Further, the mayenite-containing oxide is more preferably C12A7 crystal single phase. This is because when the mayenite-containing oxide is C12A7 crystal single phase, it thereby becomes easy to obtain an oxide having a high hydride ion density, and it is thereby possible to increase the secondary electron emission coefficient after irradiation with an ultraviolet ray, electron beam or a plasma. According to a literature (Katsuro Hayashi, Peter V. Sushko, et.al., J. Phys. Chem., B, 2005, 109, p. 23836-23842), the upper limit of the hydride ion density of the mayenite type compound is presumed to be about $1 \times 10^{20}/cm^3$.

The content of the mayenite type compound contained in the mayenite-containing oxide may be such that the hydride ion density of the mayenite-containing oxide becomes at least $1 \times 10^{18}/cm^3$. For example, in a case where the mayenite-containing oxide contains a mayenite type compound having a hydride ion density of $1 \times 10^{20}/cm^3$, the mayenite-containing oxide only needs to contain the mayenite type compound in an amount of at least 1 vol %. This is because, in such a case, the hydride ion density of the mayenite-containing oxide becomes at least $1 \times 10^{18}/cm^3$.

The concentration of negative ions of an atom having an electron affinity lower than that of an oxygen atom in the mayenite-containing oxide may be determined by using a secondary ion mass spectrometer (SIMS).

The mayenite-containing oxide obtained by the above preparation method a of the present invention may be irradiated with at least one member selected from the group consisting of electron beam, an ultraviolet ray having a wavelength of from 140 to 380 nm and a plasma to obtain an electroconductive mayenite-containing oxide containing an electroconductive mayenite type compound. The present invention also provides this preparation method of an electroconductive mayenite-containing oxide containing an electroconductive mayenite type compound. The step wherein the mayenite-containing oxide is irradiated with at least one member selected from the group consisting of electron beam, an ultraviolet ray having a wavelength of from 140 to 380 nm and a plasma to obtain an electroconductive mayenite-containing oxide containing an electroconductive mayenite type compound will hereinafter be referred to as irradiation step.

Such a preparation method of an electroconductive mayenite-containing oxide containing an electroconductive mayenite type compound is a preparation method of a mayenite-containing oxide containing an electroconductive mayenite type compound comprising the firing step, the hydrogenation step and the irradiation step, and will hereinafter be referred to also as "preparation method β of the present invention".

Now, the irradiation step in the preparation method β of the present invention will be described.

The irradiation step is not particularly limited as long as it is a step wherein the mayenite-containing oxide may be irradiated with at least one member selected from the group consisting of electron beam, an ultraviolet ray having a wavelength of from 140 to 380 nm and a plasma, and for example, a conventionally-known method may be employed. Specifically, for example, an ultraviolet ray may be applied with a high-pressure mercury lamp having an output of 1,000 W, a main wavelength of 365 nm and a main emission line of 313 nm under a condition of at a distance of 70 cm for 30 minutes. In any case where any one of electron beam, an ultraviolet ray and a plasma is applied, electrons detached from hydride ions are introduced into the cages, and an electroconductive mayenite-containing oxide containing an electroconductive mayenite type compound having an electron density of at least $1 \times 10^{18}/cm^3$ wherein cages in which free oxygen ions, $OH^-$, etc. are present and cages in which electrons are present coexist may be obtained.

Thus, the electroconductive mayenite-containing oxide, for example, has a large secondary electron emission coefficient, i.e. the electron conductive mayenite-containing oxide is excellent in electron emission characteristics.

Since the detachment of electrons from hydride ions easily proceed by the above irradiation, the electron density of the electroconductive mayenite-containing oxide may be taken as the same as the hydride ion density of the mayenite-containing oxide.

The electroconductivity of the electroconductive mayenite-containing oxide is preferably at least 0.01 S/cm, more preferably at least 0.1 S/cm. As the C12A7 concentration in the electroconductive mayenite-containing oxide becomes higher, the electroconductivity also becomes higher. When the electroconductive mayenite-containing oxide is entirely composed of C12A7, the electroconductivity becomes about 64 S/cm, in some cases.

EXAMPLES

Now, the present invention will be described in further detail with reference to Examples. However, it should be understood that the present invention is by no means limited to these Examples. Examples 1 to 11 are Working Examples and Examples 12 to 17 are Comparative Examples.

[Example 1]

First, in order that the molar ratio of calcium oxide and aluminum oxide based on their oxides (CaO and $Al_2O_3$) would be 12:7, 62.7 g of calcium carbonate and 37.3 g of aluminum oxide were mixed to obtain starting material α1.

Next, starting material α1 was subjected to the firing step in air at a heating temperature of 1,200° C. for a heating time of 2 hours. The temperature raising rate was set to be 300° C./hr. Further, the cooling rate was set to be 300° C./hr, and the cooling was carried out to room temperature. Then, 72 g of fired powder α1 was obtained. As to fired powder α1, sintering had hardly proceeded, and fired powder α1 was in an agglomerated powder form. The average particle size of the aggregates was at most 100 μm. These aggregates were crushed by means of an automatic mortar. The crushing was able to be easily carried out.

Fired powder α1 obtained after crushing was subjected to X-ray diffraction and was found to be a mixture of a calcium aluminate, calcium oxide and aluminum oxide.

Further, the average particle size of fired powder α1 was measured by laser diffraction scattering method (SALD-2100, manufactured by SHIMADZU Corporation) and was found to be 20 μm.

Next, a container made of metal molybdenum having an inner diameter of 50 mm, a height of 50 mm and a wall thickness of 1 mm was charged with 2 g of fired powder α1. Then, the container was put into an electric furnace capable of hermetically closing the container, and fired powder α1 was subjected to a hydrogenation step as follows. First, the pressure in the electric furnace was reduced to 2 Pa, and a mixed gas of hydrogen/nitrogen=3/97 (volume ratio) was allowed to flow into the electric furnace at a flow rate of 500 mL/min. The oxygen partial pressure in the nitrogen was 0.06 Pa. Further, the water vapor partial pressure was 0.01 Pa.

Then, after the pressure became ordinary, the mixed gas was continuously allowed to flow at 500 mL/min for 15 minutes to sufficiently fill the electric furnace with the atmosphere of the mixed gas. Then, while the flow rate of 500 mL/min was maintained, firing was carried out at a reduction temperature of 1,300° C. for a reduction time of 2 hours. Here, from room temperature to 1,200° C., the temperature was rapidly raised at 2,000° C./hr. Further, from 1,200 to 1,300° C., the temperature was raised at 400° C./hr. After expiration of the reduction time, quick cooling was carried out to room temperature. The rate of quick cooling was set to be 21,000° C./hr from 1,300 to 800° C.

Through such firing step and hydrogenation step, 1.8 g of oxide α1 was obtained. The obtained oxide α1 was pale yellow and was found to have only C12A7 structure by X-ray diffraction.

Next, oxide α1 was pulverized and was subjected to an irradiation step using an ultraviolet ray having a wavelength of 330 nm for an irradiation time of 30 minutes. The oxide after irradiation is taken as oxide β1. This oxide β1 was green. It is considered that this is because electrons detached from H− by the reaction of $H^- \rightarrow H^0 + e^-$ were introduced into the cages. Further, after irradiation of the above ultraviolet ray for further 40 minutes, the green color did not changed, and thus it is considered that the reaction of $H^- \rightarrow H^0 + e^-$ sufficiently proceeded by the 30 minute-irradiation.

Oxide β1 was crushed, and its signal was measured by ESR (electron spin resonance, manufactured by JOEL, Ltd., JES-TE200). At the same time, copper sulfate as a standard sample was measured. Then, the electron density was evaluated from the intensity ratio of the signal. As a result, the electron density was found to be $3.0 \times 10^{19}/cm^3$. The electroconductivity was 2.6 S/cm, and it was found to be a mayenite type compound having electroconductivity.

As described above, since it is considered that the reaction of $H^- \rightarrow H^0 + e^-$ sufficiently proceed by 30 minute-irradiation of oxide α1 with an ultraviolet ray, the electron density may be evaluated as being the same as the amount of the hydride ions. Therefore, the hydride ion density of oxide α1 before ultraviolet ray irradiation is considered to be $3.0 \times 10^{19}/cm^3$.

[Example 2]

Oxide α2 and oxide jβ2 were obtained in the same manner as in Example 1 except that the reduction temperature was set to be 1,330° C. Each of oxide α2 and oxide β2 was C12A7 single phase, and the hydride ion density of oxide α2 was $3.8 \times 10^{19}/cm^3$, and the electroconductivity of oxide β2 was 3.3 S/cm.

[Example 3]

Oxide α3 and oxide β3 were obtained in the same manner as in Example 1 except that the reduction temperature was set to be 1,250° C. Each of oxide α3 and oxide β3 was mixed phase of C12A7 and slight C3A and CA. The hydride ion density of oxide α3 was $1.8 \times 10^{19}/cm^3$, and the electroconductivity of oxide β3 was 1.0 S/cm.

[Example 4]

Oxide α4 and oxide β4 were obtained in the same manner as in Example 1 except that the reduction time was set to be 6 hours. Each of oxide α4 and oxide β4 was C12A7 single phase, and the hydride ion density of oxide α4 was $3.2 \times 10^{19}/cm^3$, and the electroconductivity of oxide β4 was 2.8 S/cm.

[Example 5]

Oxide α5 and oxide β5 were obtained in the same manner as in Example 1 except that the heating temperature was set to be 1,000° C. Each of oxide α5 and oxide β5 was C12A7 single phase, and the hydride ion density of oxide α5 was $4.2 \times 10^{19}/cm^3$, and the electroconductivity of oxide β5 was 3.7 S/cm.

[Example 6]

Oxide α6 and oxide β6 were obtained in the same manner as in Example 1 except that the cooling rate after the hydrogenation step was set to be 200° C./hr. Each of oxide α6 and oxide β6 was C12A7 single phase, and the hydride ion density of oxide α6 was $2.9 \times 10^{19}/cm^3$, and the electroconductivity of oxide β6 was 2.6 S/cm.

[Example 7]

Oxide α7 and oxide β7 were obtained in the same manner as in Example 1 except that the hydrogen-containing gas used in the hydrogenation step was adjusted to be such that hydrogen/nitrogen is 0.4/99.6 (volume ratio). Each of oxide α7 and oxide β7 was mixed phase of C12A7 and slight C3A and CA. The hydride ion density of oxide α7 was $1.1 \times 10^{18}/cm^3$, and the electroconductivity of oxide β7 was 0.1 S/cm.

[Example 8]

Oxide α8 and oxide β8 were obtained in the same manner as in Example 1 except that the hydrogen-containing gas used in the hydrogenation step was adjusted to be such that hydrogen/nitrogen is 60/40 (volume ratio). Each of oxide α8 and oxide β8 was mixed phase of C12A7 and slight C3A and CA. The hydride ion density of oxide α8 was $5.7 \times 10^{19}/cm^3$, and the electroconductivity of oxide β8 was 5.0 S/cm.

[Example 9]

Oxide α9 and oxide β9 were obtained in the same manner as in Example 1 except that the hydrogen-containing gas used in the hydrogenation step was changed to hydrogen gas (a gas having a hydrogen concentration of 100 vol %). Each of oxide α9 and oxide β9 was mixed phase of C12A7 and slight C3A and CA. The hydride ion density of oxide α9 was $2.5 \times 10^{19}/cm^3$, and the electroconductivity of oxide β9 was 2.2 S/cm.

[Example 10]

Oxide α10 and oxide β10 were obtained in the same manner as in Example 1 except that starting material α10 obtained by mixing calcium carbonate and aluminum oxide so that the molar ratio of calcium oxide and aluminum oxide would be 10:9 was used. Each of oxide α10 and oxide β10 contained mainly CA and also C12A7. The hydride ion density of oxide α10 was $2.8 \times 10^{18}/cm^3$, and the electroconductivity of oxide β10 was 0.03 S/cm.

[Example 11]

Oxide α11 and oxide β11 were obtained in the same manner as in Example 1 except that starting material α11 obtained by mixing calcium carbonate and aluminum oxide so that the molar ratio of calcium oxide and aluminum oxide would be 13.5:5.5 was used. Each of oxide α11 and oxide β11 contained mainly CA and also C12A7. The hydride ion density of oxide α11 was $1.3 \times 10^{18}/cm^3$, and the electroconductivity of oxide β11 was 0.05 S/cm.

[Example 12]

Oxide α12 and oxide β12 were obtained in the same manner as in Example 1 except that reduction temperature was set to be 1,200° C. Each of oxide α12 and oxide β12 contained mainly C3A and CA, and also slightly C12A7. The hydride ion density of oxide α12 was less then $1.0 \times 10^{17}/cm^3$. Further, the electroconductivity of oxide β12 was too low and unmeasurable.

[Example 13]

Oxide α13 and oxide β13 were obtained in the same manner as in Example 1 except that the reduction temperature was set to be 1,360° C. Each of oxide α13 and oxide β13 was C12A7 single phase, but the hydride ion density of oxide α13 was $5.0 \times 10^{17}/cm^3$, and the electroconductivity of oxide β13 was 0.04 S/cm.

[Example 14]

In contrast to Example 1 wherein starting material α1 was formed into fired powder α1 and was fired to obtain oxide α1, in Example 14, the starting material (starting material α14) same as starting material α1 was, without being subjected to crushing treatment to obtain a fired powder, fired in a mixed gas containing hydrogen (i.e. the starting material was subjected to the hydrogenation step) to obtain oxide α14. The firing method was the same as in Example 1. Further, oxide β14 was obtained in the same manner as in Example 1. Each of oxide α14 and oxide β14 was mixed phase of C12A7 and slight C3A and CA, and the hydride ion density of oxide α14 was $1.6 \times 10^{19}/cm^3$ and the electroconductivity of oxide β14 was 1.4 S/cm.

However, oxide α14 was scattered in the electric furnace. Given this situation, it is difficult to produce products efficiently. Further, the electric furnace will be damaged, and the life of the electric furnace will be significantly shortened. Particularly, such a situation is not preferred in a case where tungsten or molybdenum, which has resistance to hydrogen but is expensive, is used for the inner wall of the electric furnace. It is considered that such scattering of oxide α14 occurs because carbon dioxide gas is drastically emitted from calcium carbonate at 898° C.

[Example 15]

Oxide α15 and oxide β15 were obtained in the same manner as in Example 1 except that starting material α15 obtained by mixing calcium carbonate and aluminum oxide so that the molar ratio of calcium oxide and aluminum oxide would be 8:11 was used. Each of oxide α15 and oxide β15 contained mainly C3A and CA. The hydride ion density of oxide α15 and the electroconductivity of oxide β15 were both too low and unmeasurable.

[Example 16]

Oxide α16 and oxide β16 were obtained in the same manner as in Example 1 except that starting material α16 obtained by mixing calcium carbonate and aluminum oxide so that the molar ratio of calcium oxide and aluminum oxide would be 14.5:4.5 was used. Each of oxide α16 and oxide β16 contained mainly C3A and CA, and also slight C12A7. The hydride ion density of oxide α16 and the electroconductivity of oxide β16 were both too low and unmeasurable.

[Example 17]

Oxide α17 was obtained in the same manner as in Example 1 except that the heating temperature was set to be 1,350° C. Fired powder α17 was significantly sintered, and the whole of it was in a massiveness. Since it was difficult to pulverize such fired powder α17 directly by means of an automatic mortar, fired powder α17 was crushed by a stamp mill until the average particle size became about 5 mm and then was pulverized by using an automatic mortar. This step of pulverizing was complicated and took a long period of time, and thus it was unsuitable for mass production.

Industrial Applicability

According to the preparation method β of the present invention, an electroconductive mayenite-containing oxide having a high electroconductivity may be prepared massively, steadily and at low cost. Further, according to the preparation method a of the present invention, a mayenite-containing oxide suitable for the preparation of the electroconductive mayenite-containing oxide may be prepared massively and steadily.

The electroconductive mayenite-containing oxide is excellent in electron emission characteristics and thus may be used as field effect type electron emission materials. Thus, it becomes possible to produce electron emitting devices, display devices and small-size X-ray sources. Further, since the electroconductive mayenite-containing oxide has a small work function, it may be used also as electrode materials such as charge injection materials for organic EL devices, which are required to have special junction characteristics.

What is claimed is:

1. A method for preparing a mayenite-containing oxide, which comprises a firing step of heating a starting material containing at least one compound selected from the group consisting of a calcium aluminate, calcium oxide, aluminum oxide, a calcium compound which becomes calcium oxide by firing and an aluminum compound which becomes aluminum oxide by firing, and containing Ca atoms and Al atoms in a ratio such that, by molar ratio based on CaO and $Al_2O_3$, $CaO:Al_2O_3$ is from 9:10 to 14:5, at a temperature of from 900 to 1,250° C. to obtain a fired powder, and a hydrogenation step of firing the fired powder at a temperature of at least 1,210° C. and lower than 1,350° C. in a hydrogen-containing gas having an oxygen partial pressure of at most 1,000 Pa to obtain a mayenite-containing oxide and having a hydride ion density of at least $1 \times 10^{18}/cm^3$.

2. The method for preparing a mayenite-containing oxide according to claim 1, wherein the hydrogen-containing gas is a mixed gas of hydrogen and an inert gas.

3. The method for preparing a mayenite-containing oxide according to claim 1, wherein the hydrogen-containing gas further contains at least one member selected from the group consisting of a halogen and sulfur.

4. The method for preparing a mayenite-containing oxide according to claim 1, wherein the hydrogen-containing gas has a hydrogen concentration of from 0.2 vol % to 100 vol %.

5. The method for preparing a mayenite-containing oxide according to claim 1, wherein the starting material contains at least one compound selected from the group consisting of calcium carbonate, calcium oxide and calcium hydroxide and at least one compound selected from the group consisting of aluminum hydroxide and aluminum oxide.

6. The method for preparing a mayenite-containing oxide according to claim 1, wherein the mayenite-containing oxide has a hydride ion density of at least $1 \times 10^{19}/cm^3$.

7. The method for preparing a mayenite-containing oxide according to claim 1, wherein the fired powder obtained in the firing step is subjected to a crushing step.

8. A method for preparing an electroconductive mayenite-containing oxide, which comprises, a firing step of heating a starting material containing at least one compound selected from the group consisting of a calcium aluminate, calcium oxide, aluminum oxide, a calcium compound which becomes calcium oxide by firing and an aluminum compound which becomes aluminum oxide by firing, and containing Ca atoms and Al atoms in a ratio such that, by molar ratio based on CaO and $Al_2O_3$, $CaO:Al_2O_3$ is from 9:10 to 14:5, at a temperature of from 900 to 1,300° C. to obtain a fired powder, and a hydrogenation step of firing the fired powder at a temperature of at least 1,210° C. and lower than 1,350° C. in a hydrogen-containing gas having an oxygen partial pressure of at most 1,000 Pa to obtain a mayenite-containing oxide and having a hydride ion density of at least $1 \times 10^{18}/cm^3$; and
irradiating the obtained mayenite-containing oxide with at least one member selected from the group consisting of electron beam, an ultraviolet ray having a wavelength of from 140 to 380 nm and a plasma to obtain an electroconductive mayenite-containing oxide.

9. The method for preparing a mayenite-containing oxide according to claim 8, wherein the hydrogen-containing gas is a mixed gas of hydrogen and an inert gas.

10. The method for preparing a mayenite-containing oxide according to claim 8, wherein the hydrogen-containing gas further contains at least one member selected from the group consisting of a halogen and sulfur.

11. The method for preparing a mayenite-containing oxide according to claim 8, wherein the hydrogen-containing gas has a hydrogen concentration of from 0.2 vol % to 100 vol %.

12. The method for preparing a mayenite-containing oxide according to claim 9, wherein the starting material contains at least one compound selected from the group consisting of calcium carbonate, calcium oxide and calcium hydroxide and at least one compound selected from the group consisting of aluminum hydroxide and aluminum oxide.

13. The method for preparing a mayenite-containing oxide according to claim 8, wherein the mayenite-containing oxide has a hydride ion density of at least $1 \times 10^{19}/cm^3$.

14. The method for preparing a mayenite-containing oxide according to claim 8, wherein the fired powder obtained in the firing step is subjected to a crushing step.

15. The method for preparing a mayenite-containing oxide according to claim 1, wherein the fired powder is a member selected from the group consisting of a mixture containing a calcium aluminate and calcium oxide and/or aluminum oxide; a mixture of calcium oxide and aluminum oxide; and a calcium aluminate, wherein the calcium aluminate is a member selected from the group consisting of $3CaO \cdot Al_2O_3$, $CaO \cdot Al_2O_3$, and $5CaO \cdot 3Al_2O_3$.

16. The method for preparing a mayenite-containing oxide according to claim 8, wherein the fired powder is a member selected from the group consisting of a mixture containing a calcium aluminate and calcium oxide and/or aluminum oxide; a mixture of calcium oxide and aluminum oxide; and a calcium aluminate, wherein the calcium aluminate is a member selected from the group consisting of $3CaO \cdot Al_2O_3$, $CaO \cdot Al_2O_3$, and $5CaO \cdot 3Al_2O_3$.

* * * * *